United States Patent [19]

Eisenberg

[11] 4,029,820
[45] June 14, 1977

[54] TRACERS

[75] Inventor: Sylvan Eisenberg, San Francisco, Calif.

[73] Assignee: Micro Tracers, Inc., San Francisco, Calif.

[22] Filed: Jan. 20, 1975

[21] Appl. No.: 542,357

[52] U.S. Cl. .................................. 426/74; 426/807; 426/289; 426/97; 423/508; 252/439; 424/164
[51] Int. Cl.² ........................................ A23K 1/175
[58] Field of Search ............. 426/74, 97, 233, 289, 426/293, 648, 806, 807; 423/508; 424/162, 163, 164; 252/439

[56] References Cited

UNITED STATES PATENTS

| 2,161,066 | 6/1939 | La Lande, Jr. | 252/439 |
| 2,868,644 | 1/1959 | Eisenberg | 426/416 |
| 2,928,739 | 3/1960 | Harrel et al. | 426/74 |
| 3,886,090 | 5/1975 | Bertus | 252/439 |

OTHER PUBLICATIONS

Olson et al., Poultry Science, vol. 52, 1973, pp. 403–406, "The Stability of Inorganic Selenium in Premixes".

*Primary Examiner*—Hiram H. Bernstein
*Attorney, Agent, or Firm*—Naylor, Neal & Uilkema

[57] ABSTRACT

Tracer material formed of a finely powdered reduced iron carrier having adsorbed thereon sodium selenite or sodium selenate.

6 Claims, No Drawings

TRACERS

This invention relates to the same art as applicant's prior U.S. Pat. No. 2,868,644 and his prior U.S. Pat. No. 3,469,990.

The essential object and purpose of the present invention is to enable the addition of selenium as an essential nutrient to animal feed material under optimum control conditions as to safety and precision of measureability.

The element selenium is an essential nutrient and under current U.S. Food and Drug Regulations may be added to certain animal feeds. It may be added only as sodium selenite or sodium selenate, and may be added only as a premix in which the selenium compound has been so diluted that not less than one pound of premix is added per ton of completed feed. The latter requirement is designed to assure uniform distribution of the selenium. Since the added selenium is limited to a maximum of 0.2 ppm in completed feeds, its uniform distribution is imperative.

At concentrations less than one hundred times nutrient levels selenium and its compounds are toxic by ingestion. Consequently each production batch of premix must according to the Food and Drug Regulation be assayed to assure conformance to the quantitative requirements of the Regulation. This assay requirement presents practical problems to the premix manufacturer. The premixes cannot properly be shipped until laboratory assay results are at hand. Assays at best require one to two days, and at worst several weeks. They cost a minimum of $10.00 and may cost as much as $35.00.

Premix manufacturers who manufacture premixes more dilute than the maximum permitted so that the premix may be used at 10 lbs/ton or 20 lbs/ton completed feed rather than the 1 lb/ton specified are handicapped by having to run 10 to 20 times as many assays. This makes such premixes impractically costly.

Further, selenium compounds are toxic not only by ingestion, but by absorption through the skin and by inhalation. This presents hazards to the premix manufacturer.

This invention describes a composition of matter designed to serve as a selenium source in the manufacture of premixes. It is designed to minimize the hazard of handling selenium compounds, to maximize assurance of uniform distribution of selenium both in the premix and in the completed feed, and to permit rapid in-plant assaying of premixes at little cost.

I have discovered that sodium selenite or sodium selenate can be adsorbed on reduced iron from aqueous solution to yield a free-flowing relatively dust-free homogeneous powder. Homogeneity in terms of uniformity of distribution of selenium is such that 0.5 gm. samples taken at random from 500 lb. batches differ from each other by only ±1.5% (coefficient of variation) a value matching the uncertainty of the analytical method used for determining the selenium content. Depending upon formulation this powder can be produced to contain between 0.4% and 4.0% selenium, a value much lower than that for sodium selenite which contains 46% selenium, or sodium selenate which contains 42% selenium.

I have further discovered that products in this composition range when mixed in specified proportion with limestone, rice hulls, grain or other materials used in the manufacture of premixes, produce a more uniform premix than otherwise possible. This is because (1) the subject reduced iron/selenium salt composition is uniform, (2) it is added to the premix at 10 to 100 times the quantity of selenium salt ordinarily used, and (3) the selenium migrates from the subject composition to the other premix components so that the selenium distribution becomes progressively more uniform in the premix during storage. A day after the manufacture of a premix only 13% of the added selenium was retained on the subject composition separated from the premix magnetically, yet 87% of added selenium was recovered as sodium selenite by analysis of a premix that had been stored for 11 months.

Not only does the subject composition of reduced iron and selenium salt provide improved dispersion of selenium in premixes and in complete feeds, but it serves other functions. Specifically, it is safer to handle and it permits rapid inplant assaying of premixes at little cost.

Hazard is reduced because it contains less selenium than do the selenium compounds, because it is more dense and therefore less likely to be conveyed as airborne dust, and because it lends itself to unit packaging; that is, one package may be used per ton of premix thus avoiding in-plant weighing of toxic materials.

Rapid in-plant assaying is done simply by removing the reduced iron vehicle magnetically from a small sample of the premix, and weighing it. The percentage iron found multiplied by the proportion of selenium certified by analysis as present in the subject composition gives the selenium content of the premix. The entire assay can be performed using a magnetic rotary detector and a semi-analytical balance in less than 5 minutes. Samples taken during mixer discharge permit evaluating uniformity of the mix.

The following data from commercially produced premixes illustrate the accuracy of the method.

SELENIUM

| SPECIFIED | FOUND BY | |
|---|---|---|
| | SUBJECT METHOD | CHEMICAL ASSAY |
| % | % | % |
| 0.00133 | 0.00162 | 0.00156 |
| 0.00160 | 0.00170 | 0.00188 |
| 0.00200 | 0.00228 | 0.00231 |
| 0.00250 | 0.00266 | 0.00277 |
| 0.00400 | 0.00408 | 0.00350 |
| 0.00493 | 0.00422 | 0.00303 |
| 0.00546 | 0.00606 | 0.00652 |

The following formulation and manufacturing procedure is given by way of example:

| Reduced Iron | 500 | lbs. |
|---|---|---|
| Sodium Selenite | 11.8 | lbs. |
| Sodium Carbonate | 0.5 | lbs. |
| Water | 20 | lbs. |

The reduced iron is finely powdered essentially 100% passing 100 mesh (149 microns) and less than 50% passing 325 mesh (44 microns). The sodium selenite is anhydrous powder. The sodium carbonate is also anhydrous powder. It is included in the formulation to protect the iron from corrosion during processing and also serves to protect the selenium compound from being reduced to lower valence states, such as elemental selenium or hydrogen selenide. The salts are first dissolved in the water. The resulting solution is then transferred to a mixer which has been previously charged with the reduced iron. The mixer is sealed and the contents are mixed until uniform. Suction is then applied to the mixer and the mixer is heated to induce drying. When dry, samples are taken from the mixer and assayed. The product as formulated should contain 1.05% selenium. Additional reduced iron may be incorporated in the mix if necessary to meet a preset specification of 1.00% selenium plus or minus a preset tolerance. The mixer is then discharged and samples are taken during discharge for final quality control. When sodium selenate is used, also as an anhydrous powder, 12.89 lbs. of it would be formulated into the above formula in place of the 11.8 lbs. of sodium selenite.

The product is then packed in pails, 40 lbs. per pail. One such pail supplies selenium just sufficient to produce 1 ton of premix containing 0.0200% selenium, this being the maximum permitted under U.S. Food and Drug Regulations.

What is claimed is:

1. A composition of matter in the form of a generally homogeneous feed premix admixture comprised of a major portion of an animal feed, a minor portion of a feed supplement or micro-ingredient, and a tracer provided in a preselected ratio with said micro-ingredient, said tracer comprising finely powdered reduced iron of from about 40 to about 150 microns in particle size, said iron having adsorbed thereon from about 0.4% to about 4% by weight of selenium in the form of sodium selenite or sodium selenate, the selenium being present in amount up to about 200 ppm in said feed premix admixture.

2. A dry pulverulent complete feed composition having as a uniformly distributed ingredient selenium, up to about 0.2 ppm, in the form of sodium selenite or sodium selenate adsorbed to the extent of from about 0.4% to about 4.0% by weight onto finely powdered magnetically attractable iron of from about 40 to about 150 microns in particle size.

3. A tracer for animal feed material comprising finely powdered magnetically attractable iron of a particle size of from about 40 to about 150 microns, said iron having adsorbed thereon from about 0.4% to about 4% by weight of selenium in the form of sodium selenite or sodium selenate.

4. A composition of matter in the form of a generally homogeneous feed premix admixture comprised of a major portion of an animal feed, a minor portion of a feed supplement or micro-ingredient, and a tracer provided in a preselected ratio with said micro-ingredient, said tracer comprising finely powdered reduced iron of from about 40 to about 150 microns in particle size having adsorbed thereon from about 0.4% to about 4% by weight of selenium in the form of sodium selenite or sodium selenate, the selenium being present in amount up to about 200 ppm in said feed premix admixture, said iron having also adsorbed thereon about 0.1% by weight of sodium carbonate.

5. A dry pulverulent complete feed composition having as a uniformly distributed ingredient selenium, up to about 0.2 ppm, in the form of sodium selenite or sodium selenate adsorbed to the extent of from about 0.4% to about 4.0% by weight onto finely powdered magnetically attractable iron of from about 40 to about 150 microns in particle size, said iron having also adsorbed thereon about 0.1% by weight of sodium carbonate.

6. A tracer for animal feed material comprising finely powdered magnetically attractable iron of a particle size of from about 40 to about 150 microns having adsorbed thereon from about 0.4% to about 4.0% by weight of selenium in the form of sodium selenite or sodium selenate, said iron having also adsorbed thereon about 0.1% by weight of sodium carbonate.

* * * * *